United States Patent
Evert

(10) Patent No.: US 10,240,337 B2
(45) Date of Patent: Mar. 26, 2019

(54) PERSONAL, RELOCATABLE PROTECTIVE ENCLOSURE

(71) Applicant: Stephen T. Evert, Houston, TX (US)

(72) Inventor: Stephen T. Evert, Houston, TX (US)

( * ) Notice: Subject to any disclaimer, the term of this patent is extended or adjusted under 35 U.S.C. 154(b) by 0 days.

(21) Appl. No.: 16/004,400

(22) Filed: Jun. 10, 2018

(65) Prior Publication Data

US 2018/0291614 A1 Oct. 11, 2018

Related U.S. Application Data

(63) Continuation-in-part of application No. 15/826,866, filed on Nov. 30, 2017, now abandoned.

(60) Provisional application No. 62/430,867, filed on Dec. 6, 2016.

(51) Int. Cl.
| | |
|---|---|
| *E04B 1/10* | (2006.01) |
| *E04B 1/343* | (2006.01) |
| *E04H 9/10* | (2006.01) |
| *E04H 9/14* | (2006.01) |
| *E04H 1/12* | (2006.01) |
| *E04H 9/06* | (2006.01) |
| *E04B 1/32* | (2006.01) |

(52) U.S. Cl.
CPC ...... *E04B 1/34321* (2013.01); *E04B 1/34347* (2013.01); *E04H 1/1205* (2013.01); *E04H 9/06* (2013.01); *E04H 9/10* (2013.01); *E04H 9/14* (2013.01); *E04B 2001/3276* (2013.01); *E04B 2001/34389* (2013.01); *E04H 1/1272* (2013.01)

(58) Field of Classification Search
CPC ....... E04B 1/34321; E04B 2001/34389; E04H 9/10; E04H 9/14

USPC .................................. 49/301, 347; 52/79.5
See application file for complete search history.

(56) References Cited

U.S. PATENT DOCUMENTS

| | | | | |
|---|---|---|---|---|
| 3,512,316 | A * | 5/1970 | Parr | E04B 1/34321 52/262 |
| 4,787,181 | A * | 11/1988 | Witten | E04B 1/3483 220/4.21 |
| 5,123,874 | A * | 6/1992 | White, III | E04B 1/34321 181/290 |
| 5,224,315 | A * | 7/1993 | Winter, IV | E04B 1/14 428/218 |
| 6,948,281 | B1 * | 9/2005 | Carmichael | E04H 9/14 52/86 |
| 8,534,001 | B2 * | 9/2013 | Scott, IV | E04H 9/14 52/2.11 |

(Continued)

OTHER PUBLICATIONS

Wikipedia, Engineered Cementitious Composite, retrieved Oct. 30, 2018.
Wikipedia, Fiber Cement Siding, retrieved Oct. 30, 2018.

*Primary Examiner* — Paola Agudelo
(74) *Attorney, Agent, or Firm* — William Lovin & Assoc., LLC; William R. Lovin

(57) ABSTRACT

The application relates to a standalone portable protective enclosure that forms a complete envelope surrounding and protecting its contents from the extreme forces of nature and man. The invention can have other uses other than a protective enclosure and will not be out of place in a living room of a home. The invention pertains to a protective enclosure that is resistant to high velocity projectiles and massive blunt forces. More particularly, this invention relates to a protective enclosure that can be site assembled from matching parts and may be disassembled and relocated to different locations.

5 Claims, 7 Drawing Sheets

(56) References Cited

U.S. PATENT DOCUMENTS

| | | | | |
|---|---|---|---|---|
| 8,621,790 | B2* | 1/2014 | Lekhtman | E04D 13/0481 |
| | | | | 52/167.1 |
| 9,797,153 | B2* | 10/2017 | Baggiero, II | E04H 9/06 |
| 2003/0075285 | A1* | 4/2003 | Anderson | E06B 7/30 |
| | | | | 160/90 |
| 2003/0126805 | A1* | 7/2003 | Roberts | E04H 9/14 |
| | | | | 52/80.1 |
| 2005/0284035 | A1* | 12/2005 | DeOvando | E04B 1/3431 |
| | | | | 52/79.1 |
| 2006/0185260 | A1* | 8/2006 | Dehart | E04H 9/10 |
| | | | | 52/36.1 |
| 2009/0004430 | A1* | 1/2009 | Cummins | E04H 9/10 |
| | | | | 428/113 |
| 2009/0217600 | A1* | 9/2009 | De Azambuja | B60P 3/34 |
| | | | | 52/79.5 |
| 2010/0043309 | A1* | 2/2010 | Martin | E03C 1/01 |
| | | | | 52/79.5 |
| 2010/0050556 | A1* | 3/2010 | Burns | E04B 1/34321 |
| | | | | 52/592.1 |
| 2012/0222367 | A1* | 9/2012 | Wirtz | E04H 1/1205 |
| | | | | 52/79.1 |
| 2013/0019542 | A1* | 1/2013 | Bishop | E04H 9/14 |
| | | | | 52/79.11 |
| 2014/0259976 | A1* | 9/2014 | Bowers | E04H 9/14 |
| | | | | 52/79.5 |
| 2015/0068466 | A1* | 3/2015 | Piccioni | E04B 1/34363 |
| | | | | 119/448 |
| 2015/0096478 | A1* | 4/2015 | Magiera | E04H 9/06 |
| | | | | 109/23 |
| 2015/0308135 | A1* | 10/2015 | Athanasiou | E04H 1/12 |
| | | | | 52/79.5 |
| 2017/0211268 | A1* | 7/2017 | Eichhorn | E04C 2/24 |

* cited by examiner

PERSONAL, RELOCATABLE PROTECTIVE ENCLOSURE

CROSS-REFERENCE TO RELATED APPLICATIONS

This application makes reference to U.S. patent application Ser. No. 15/826,866 filed Nov. 30, 2017 which in turn makes reference to U.S. Prov. Pat. App. No. 62/430,867 filed Dec. 6, 2016. This application incorporates these preceding applications, in their entirety, by reference.

FIELD OF THE INVENTION

The present invention relates to a standalone portable protective enclosure that forms a complete envelope surrounding and protecting its contents from the extreme forces of nature and man. The present invention can have other uses other than a protective enclosure and will not be out of place in a living room of a home. More specifically, the present invention pertains to a protective enclosure that is resistant to high velocity projectiles and massive blunt forces. More particularly this invention relates to a protective enclosure that can be site assembled from matching parts and be able to be disassembled and relocated to different locations with ease.

BACKGROUND OF THE INVENTION

Since the beginning of time humans have realized the need for protective enclosures. The extreme forces of nature and man will always be present. Protective enclosures are needed to protect persons, animals, plants and valuable property from theft, harm and or destruction. Prior to the present embodiments, individuals seeking to provide shelter for themselves, their families, their animals, their plants and or other valuable possessions during a more intense than normal force event had few alternatives. To date, there are large box-like and spherically shaped shelters that are installed partially or completely underground. There are also shelters that are built above or in connection with a bed or a coffee table etc. There are also shelters that are poured in place concrete and therefore become an appurtenance to the real estate. These prior sheltering devices typically contain many parts and or are heavy, large and permanent.

In addition, the fabrication and installation of these shelters typically require digging, drilling, welding, connecting a great number of parts together with bolts all of which may be impossible or too costly for persons needing the protective enclosure. Simply put, regardless of catastrophic damage, death, and destruction that occur from the extreme forces of nature (and man-caused destruction) relatively little affordable protection is provided.

Moreover, the average American family moves approximately every seven years. The average family today is more likely to be a renter and their dwelling is likely to be on the second floor or above. Thus, a shelter that would be easy to relocate would be desirable. Protective enclosures that can go through a window, ride up in an elevator, or be carried upstairs would be optimal. Also, the ability to go through a standard size entry door would be required.

Consequentially, there is a need for an inexpensive shelter that can be used by all individuals, including those who are handicapped, have low income and may be condominium owners or renters living in a high rise. There is a further need for a shelter that is convenient when needed and not buried in the yard and still be a complete enclosure that is strong enough to withstand high velocity projectiles and massive blunt forces. There is a further need for a shelter that requires minimal and easy assembly. There is a further need for a shelter that is versatile and can be used for purposes other than as an emergency shelter.

The adaptability of a protective enclosure that can also be a piece of furniture in any living room supports sales. The need for quick easy access in the dark argues for an embodiment that is internal to a dwelling or place of business such as an office or school.

Since community shelters are not close by to users needing shelter and these types of shelters often do not allow for pets, there is a need for a personal relocatable shelter in an individual's place of residence or business.

Moreover, the prior art discloses very little in the way of protective enclosures for large animals such as horses, motor vehicles, firearms, ammunition, seeds, food, water, gems, precious metals, keepsakes, collector items, etc.

SUMMARY OF THE INVENTION

The present disclosure accordingly provides an improved protective enclosure that overcomes the disadvantages and limitations associated with prior protective enclosures. The present invention improves the state of the art.

The first objective of the disclosure is to provide an easily assembled and relocatable protective enclosure for protecting the contents from the extreme forces of nature and man that can be produced at a minimal cost to merit its need.

The second objective of the disclosure is to provide a protective enclosure that can be manufactured from a relatively strong, yet inexpensive material such as an engineered cementitious composite (ECC)/elastomer sandwich forming several panels.

The third objective of the disclosure is to provide a protective enclosure that can be structured to provide optimum protection against a wide selection of hazards including high velocity projectiles and massive blunt forces.

The forth objective of the disclosure is to provide a protective enclosure that can be marketed either assembled or unassembled.

The fifth objective of the disclosure is to provide a protective enclosure that can be compactly packaged for low-bulk, inexpensive and convenient transport The sixth objective of the disclosure is to provide a protective enclosure that can be assembled by inexperienced persons.

The seventh objective of the disclosure is to provide a protective enclosure that can be manufactured in different sizes to meet different user requirements.

The eighth objective of the disclosure is to provide a protective enclosure that can be used for storage of food, water and other survival needs to sustain several persons for several days.

The ninth objective of the disclosure is to provide a protective enclosure that can be disassembled and transported to a new location should the need arise.

The tenth objective of the disclosure is to provide a protective enclosure that can be tested and certified to published standards.

The eleventh objective of the disclosure is to provide a protective enclosure that can be used as an annex to a building.

The twelfth objective of the disclosure is to provide a protective enclosure that can be positioned anywhere.

The thirteenth objective of the disclosure is to provide a protective enclosure embodiment that will have a serial number so that it can be financed and relocated if need be.

The fourteenth objective of the disclosure is to provide a protective enclosure embodiment that can be transported in small aircraft, watercraft, small off road vehicles, and by pack animal such as a horse or mule.

The fifteenth objective of the disclosure is to provide a protective enclosure that could have an emergency lighting system.

The sixteenth objective of the disclosure is to provide a protective enclosure embodiment that would have a multiplicity of escape hatches that a child could operate and therefore get out of the protective enclosure unaided by an adult. This embodiment would be a sanctuary for "latch key" children until an adult arrives.

The seventeenth objective of the disclosure is to provide a protective enclosure that will have apertures to allow ambient light to enter and for the occupants to be able to view the outside environment.

The eighteenth objective of the disclosure is to provide a protective enclosure embodiment that could have an attachment point for a strap to orient a 90° corner of the embodiment into the oncoming wind. The protective enclosure when so oriented ensures that winds coming to it from any horizontal direction will always hit the protective enclosure obliquely, a component vector of such wind force is far less than the vector at 90° to a flat broad side of the protective enclosure. The side loading will be reduced therefore reducing the chances of the protective enclosure moving any further than the length of the strap.

The nineteenth objective of the disclosure is to provide a protective enclosure that will be the result of a mostly automated mass production manufacturing process.

The twentieth objective of the disclosure is to provide a protective enclosure in which one embodiment could have a battery powered air handling system for ingress and egress of air.

The twenty-first objective of the disclosure is to provide a protective enclosure that could be a place of solace as well as a shelter.

The twenty-second objective of the disclosure is to provide a protective enclosure embodiment that will be strong enough to protect the contents from being harmed or destroyed by the efforts of rescue workers using heavy equipment.

The twenty-third objective of the disclosure is to provide a protective enclosure embodiment that is of sufficient weight and bulk that, in combination with an axis orientation strap to orientate the protective enclosure in an oblique position to the horizontal wind generated aerodynamic loads, that there will not be a need for further attachment to the surface where it sits.

The twenty-forth objective of the disclosure is to provide a protective enclosure embodiment that is self-contained and does not depend on anything in its environment to be successful in achieving its stated objective.

The twenty-fifth objective of the disclosure is to provide a protective enclosure embodiment that is both less obtrusive and takes up less space than traditional shelters. The protective enclosure may be decorated to appear as, for example, fine furniture, a child's playhouse, a "man cave", a sauna, a tanning booth, or a safe room hidden behind a cabinet.

The twenty-sixth objective of the disclosure is to provide a protective enclosure embodiment that is easy for the average person to assemble.

The twenty-seventh objective of the disclosure is to provide a protective enclosure embodiment that is capable of withstanding the elements, i.e. which will not rust and will support a snow load.

Further, numerous other objects, advantages, and features in some embodiments will be readily apparent to those of skill in the art upon a review of the following drawings and descriptions of the embodiments.

DETAILED DESCRIPTION OF THE EMBODIMENTS

Figure 1:
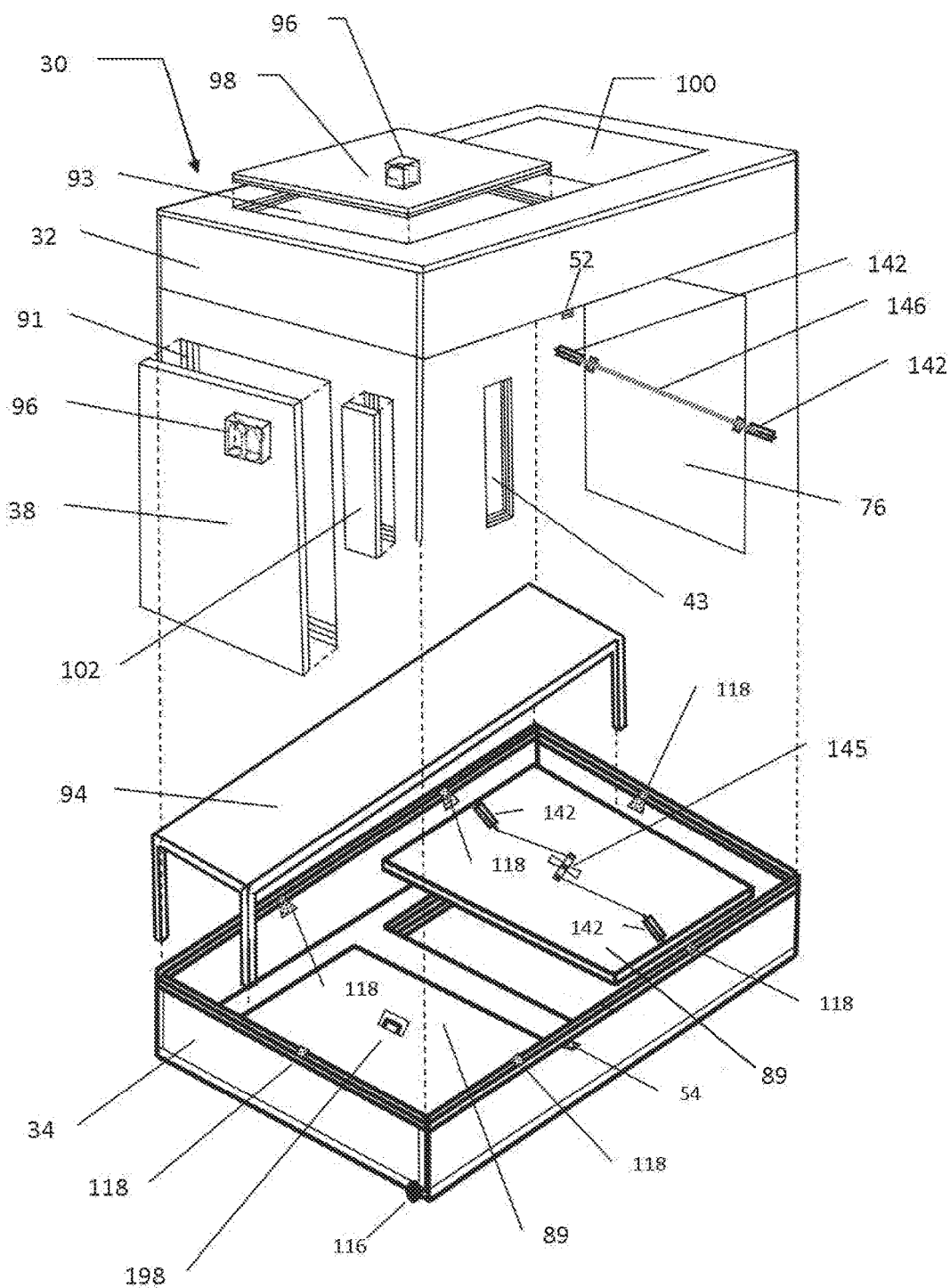
FIG. 1 shows an isometric view of a novel personal, relocatable protective enclosure. The enclosure is pictured such that the walls are partially transparent.
Figure 2:
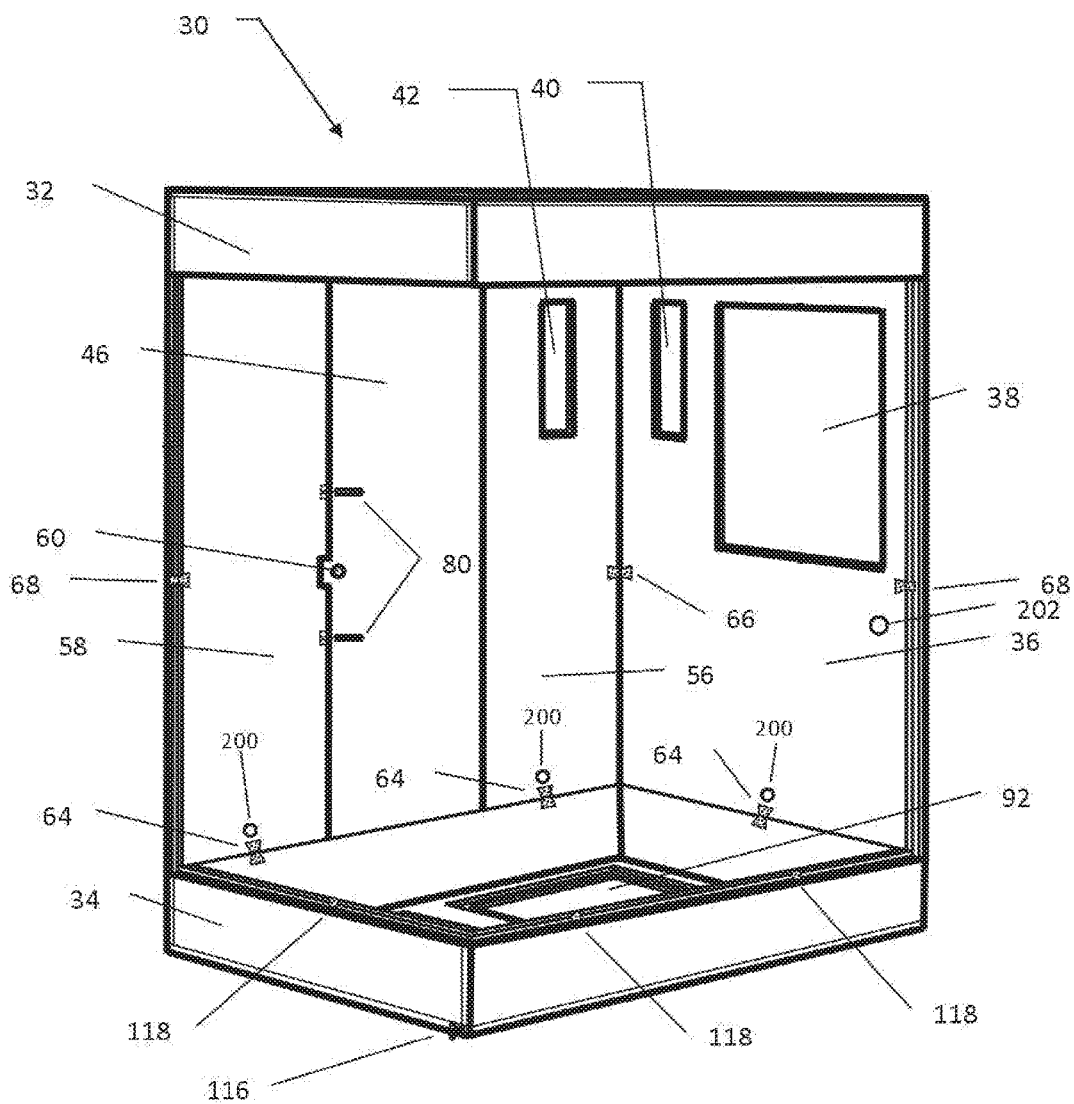
FIG. 2 shows an isometric view showing an enclosure bottom tub, an enclosure top tub, hinged doors, and side panels showing a multiplicity of female interconnect openings.

Referring now to FIGS. 1, 2, 3a, 3b, 4a, 4b, 5a, and 5b a cut away view of one embodiment of the present invention is shown. Protective enclosure 30 is comprised of enclosure top tub 32 and enclosure bottom tub 34, at least one hinged door 46, and a multiplicity of enclosure side panels 36, 56, and 58.

Enclosure top tub 32, enclosure bottom tub 34, hinged door 46, and multiplicity of enclosure side panels 36, 56, and 58 are all molded composite structures comprised of outside 127 and inside 126 layers of engineered cementitious composite interposed on both sides of an elastomeric panel 125. The panels are assembled by gluing outside 127 and inside 126 layers of engineered cementitious composite with elastomeric panel 125 interposed between them using epoxy/polyester cement 133 applied in a matrix of dots or point applications. It will be obvious to those having skill in the art that the epoxy/polyester cement 133 may also be applied laminarly. The resulting panels are cement based, yet slightly flexible and are molded in a production form. The resulting multi-layer structures can control the splay and spall created when the panel is struck with potentially penetrating impact articles. This improves the survivability of internally resident people and goods. Of course, it will be obvious to those having skill in the art that while the disclosed embodiment of the present invention exhibits two layers of engineered cementitious composite (outside 127 and inside 126) with an elastomeric panel 125 interposed between them that an unlimited number of additional layers of engineered cementitious composite and elastomeric material may be added when a panel is formed.

Enclosure top tub 32, enclosure bottom tub 34, hinged door 46, and multiplicity of enclosure side panels 36, 56, and 58 possess an arbitrary number of secured hatches 38, 76, 89, 98, and 100 and translucent plastic panels 102 affixed into or glued into female interconnect openings 40, 42, 43, 91, 92, and 93. The hinged door 46, secured hatches 38, 76, 89, 98, and 100, and translucent plastic panels 102 are mounted to their respective enclosure top tub 32, enclosure bottom tub 34, and enclosure side panels 36, 56, and 58 using a stepped technique such that at least one ridge prevents the hinged door 46, secured hatches 38, 76, 89, 98, and 100, and translucent plastic panels 102 from being pushed or blown into protective enclosure 30.

Enclosure top tub 32, enclosure bottom tub 34, hinged door 46, and multiplicity of enclosure side panels 36, 56, and 58 are assembled into the desired configuration and clipped together from the inside. Flat attachment clips 64 and corner attachment clips 66 and 68 are fitted into mating flat attachment clip female interconnect recesses 118 and corner attachment clip female interconnect recesses (not shown). Flat attachment clips 64 and corner attachment clips 66 and 68 are configured so that once installed the enclosure top tub 32, enclosure bottom tub 34, and side panels 36, 56, and 58 are securely and rigidly held together.

Molded into enclosure bottom tub 34 is grounding eye 116. Grounding eye 116 is used to fasten the constructed protective enclosure 30 to the ground or other secure structure. Grounding eye 116 is affixed and externally exposed at a lower corner 117 of enclosure bottom tub 34. A cable or some other flexible, strong structure is connected between grounding eye 116 and a nearby secure structure affixed to the earth or some other structure affixed to the earth.

Figure 3A:
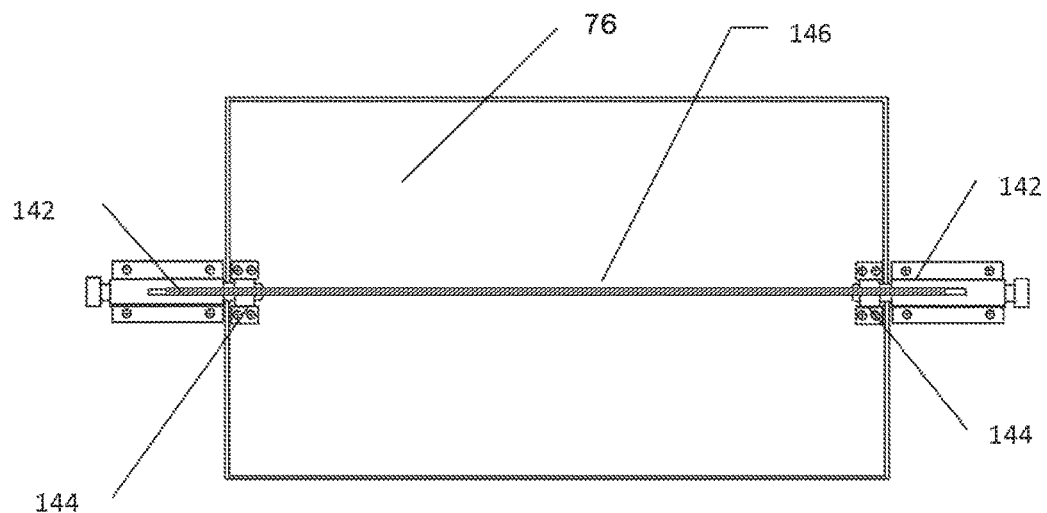
FIG. 3a shows a plan view of an escape hatch removed by pulling on a cord.
Figure 4A:
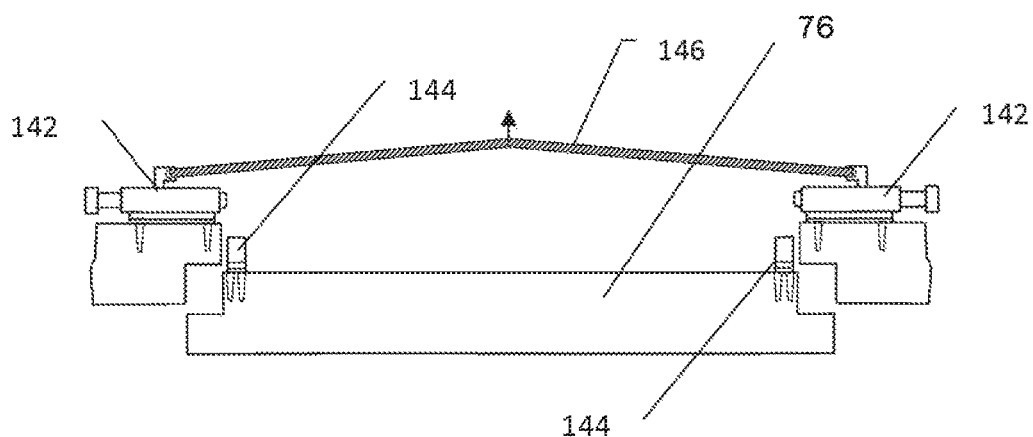
FIG. 4a shows an elevation view of an escape hatch removed by pulling on a cord.

Secured hatches 38, 76, 89, 98, and 100 are affixed into their associated female interconnect opening using one of two techniques:

First, turning to FIGS. 3a and FIG. 4a, locking points 144 are affixed near the edge of secured hatch 76. After secured hatch 76 is installed in the female interconnect opening intended for it, secured hatch 76 is affixed by operating the buttons at the end of each clip shaft 142 thus forcing the end of the clip shaft through its respective locking point 144. This closes secured hatch 76. To open secured hatch 76, the user pulls cord 146. This causes the spring loaded ends of clip shafts 142 to be withdrawn from locking point 144 into which they are locked.

Figure 3B:
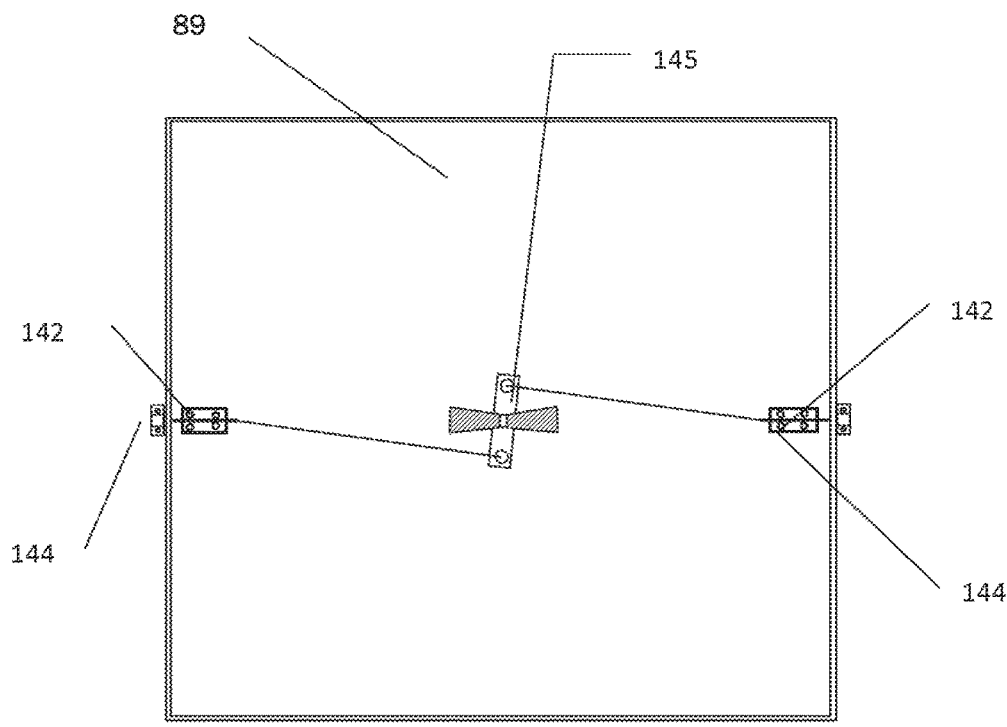
FIG. 3b shows a plan view of an escape hatch removed by rotating a handle.
Figure 4B:
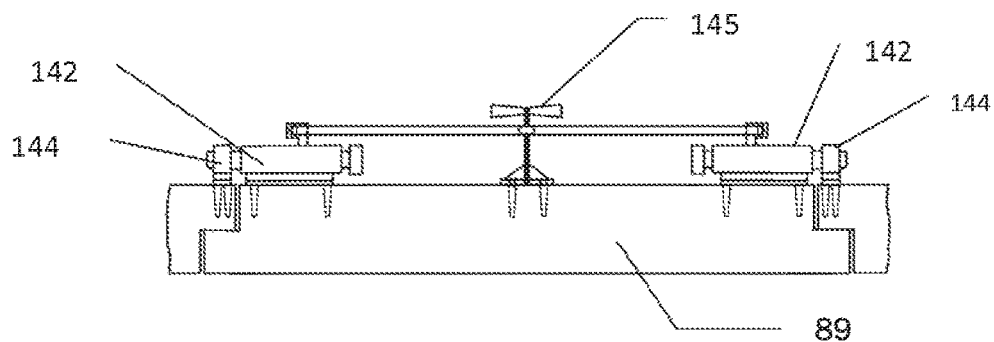
FIG. 4b shows an elevation view of an escape hatch removed by rotating a handle.
Figure 5A:
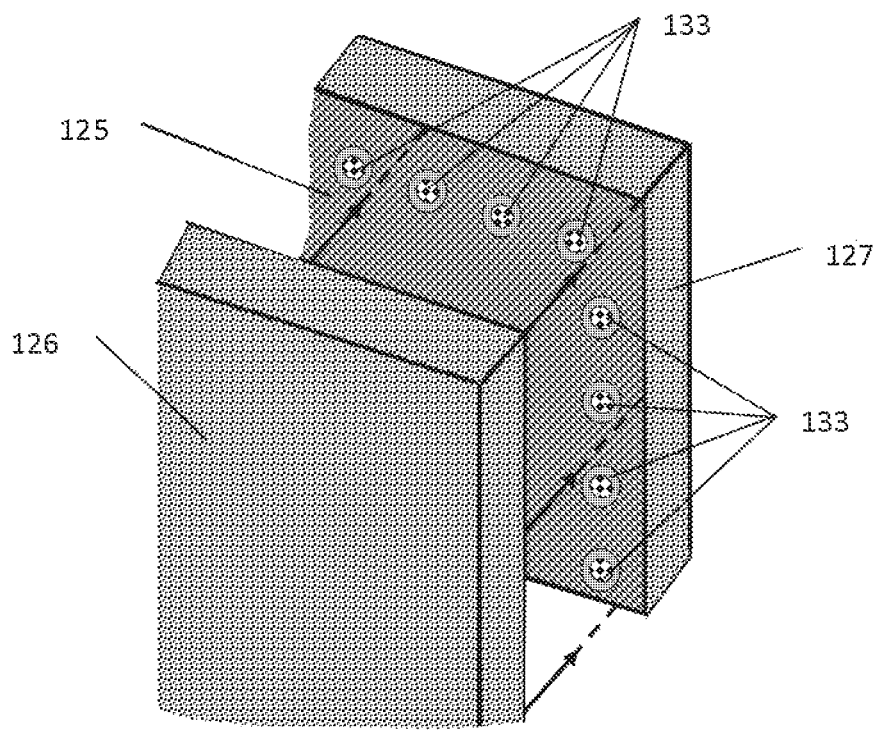
FIG. 5a shows a preassembly view of a section of engineered cementitious composite material before assembly.
Figure 5B:
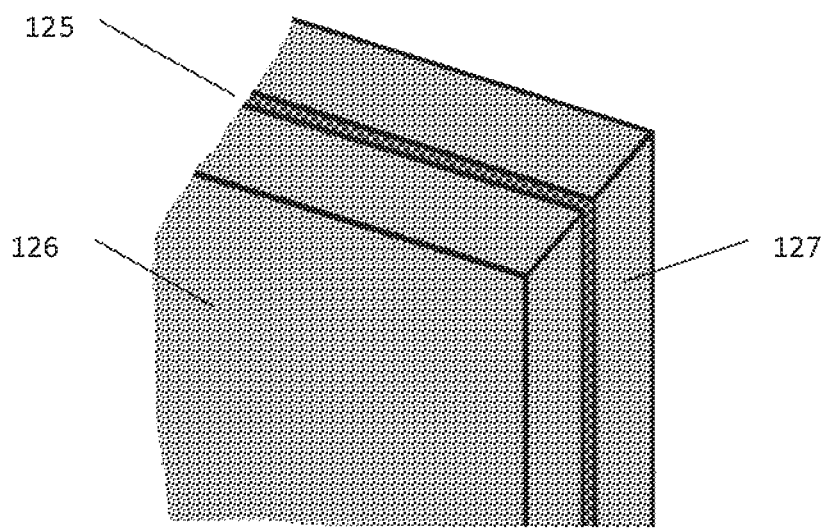
FIG. 5b shows an assembly view of a section of engineered cementitious composite material after assembly.

Second, turning to FIGS. 3b and FIG. 4b an alternate method of locking secured hatch 89 into its associated female interconnect opening 40, 42, 43, 91, 92, and 93 is shown. After secured hatch 89 is installed in the female interconnect opening intended for it, secured hatch 89 is affixed by operating the buttons at the end of each shaft comprising each clip shaft 142 such that the end of the clip shaft through its respective locking point 144. This closes secured hatch 89. To open secured hatch 89, the user rotates handle 145. This causes the ends of clip shafts 142 to be withdrawn from locking point 144 into which they are locked.

Returning now to FIGS. 1 and 2, translucent plastic panels 102 are permanently glued or otherwise sealed in their respective associated aperture interconnects 42 and 43.

One or more secured hatches 38, 76, 89, and 98 are equipped with fresh air exchange system 96. Fresh air exchange system 96 comprises a battery, low speed fan, and switch capable of supplying air from the outside of protective enclosure 30 to the inside of protective enclosure 30.

There may be an arbitrary number of secured hatches 38, 76, 89, 98, and 100. But, they are ordinarily equipped on enclosure top tub 32 and at least one side panel. By this means, the user may egress even if protective closure 30 has been forced on its side or top.

Figure 6:
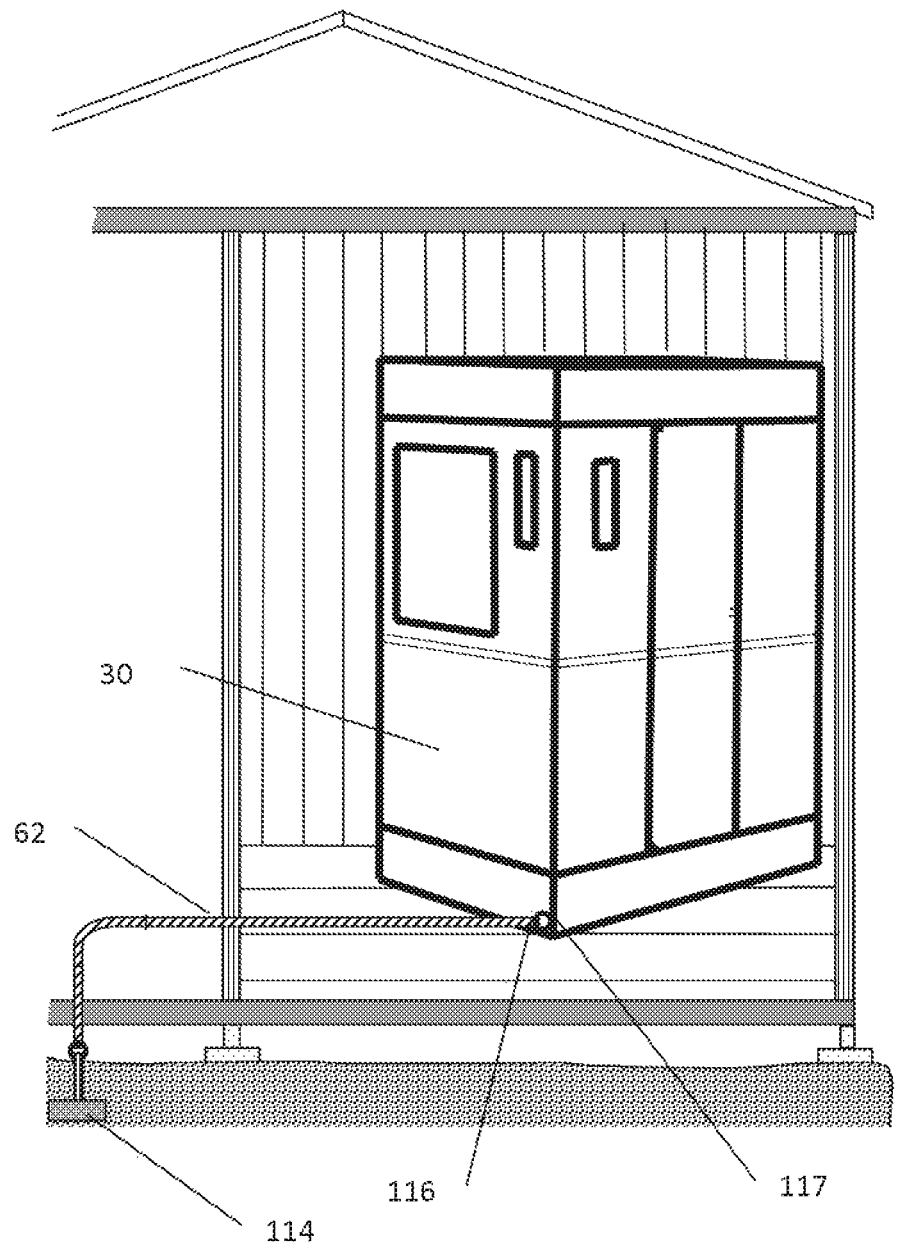
FIG. 6 shows an embodiment of the present invention installed and ready for use in a house or other structure.
Figure 7:
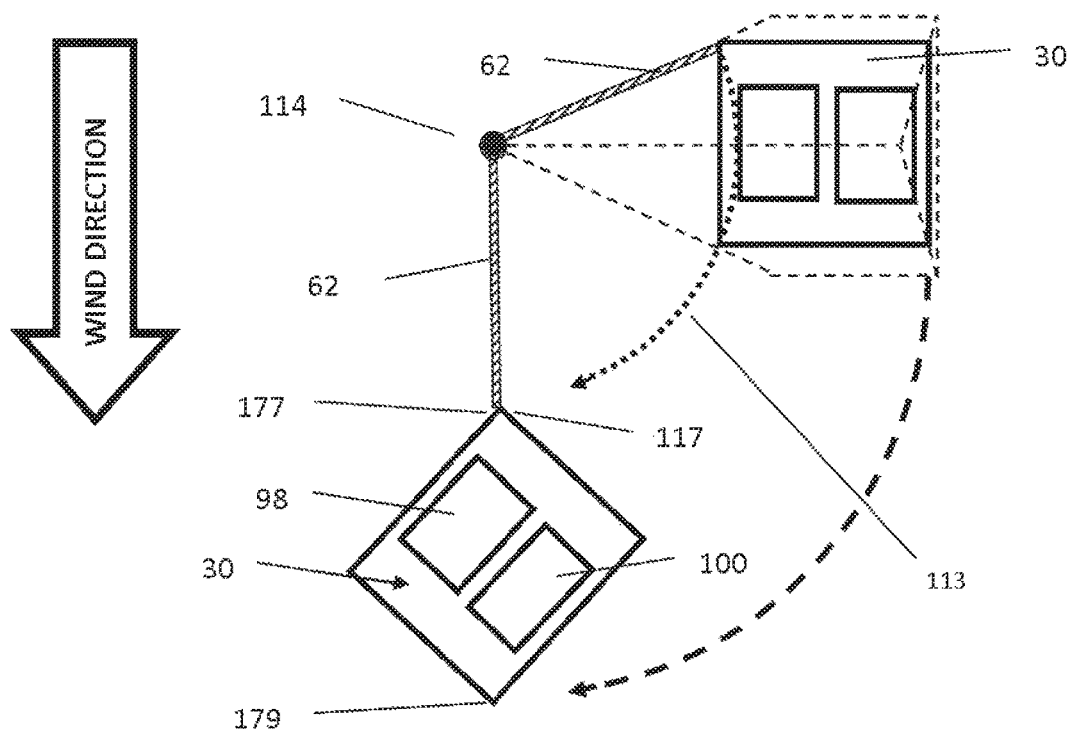
FIG. 7 shows a plan view illustrating how the anchoring strap and one embodiment of the present invention rotates in an intense wind or in response to a massive blunt force such that the direction of the wind or blunt force does not impact the enclosure perpendicularly.

Turning now to FIGS. 6 and 7, protective enclosure 30 is ordinarily affixed to an earthen anchor point 114 by a rope, strap, or metal rod 62 between grounding eye 116 and earthen anchor point 114. Grounding eye 116 is affixed and externally exposed at a lower corner 117 of enclosure bottom tub 34. This provides a solid earth ground for protective enclosure 30.

Ordinarily, protective enclosure 30 moves away from (in the direction of) a strong wind or blunt force when it encounters such a force. In such cases, protective enclosure 30 orients itself in a free-flow setting such that the direction of force from the wind or the blunt force is not perpendicular to a side of protective enclosure 30. Protective enclosure 30 is anchored to earthen anchor point 114 by rope, strap, or metal rod 62 so physical movement in a storm or in response to a blunt force is a relatively minor concern.

Returning now to FIGS. 1 and 2, the location of hinged door 46 door is arbitrary, the number and location of the various female interconnect openings 40, 42, 43, 91, 92, 93 is arbitrary and the number and location of the escape hatches with quick release mechanisms 38, 76, 89, 98, and 100 is arbitrary. The mounting points 200 for interior and exterior cladding to suit ones needs is also arbitrary.

Obviously, one may equip protective enclosure 30 with bench 94, etc. and other user appropriate items.

What is claimed is:

1. A protective enclosure comprised of:
   a. an enclosure top, enclosure bottom, and at least three enclosure side panels removably sealed together such that when constructed the enclosure top and enclosure bottom are substantially parallel and separated apart wherein at least one female interconnect opening equipped with a securable hatch is mounted in at least one of the enclosure top or enclosure bottom and at least one of the foregoing side panels;
      i. wherein the enclosure top, enclosure bottom, enclosure side panels, and securable hatches are constructed of at least two laminated engineered cementitious composite sheets with at least one interior elastomeric layer adhesively adhered in between them that controls the splay and spall created when a penetrating impact article impacts the enclosure top, enclosure bottom, or enclosure side panel;
      i. wherein at least one securable hatch is equipped with an air flow system; and
   b. one externally exposed grounding eye mounted at one corner of the enclosure bottom having attached a rope, strap or metal rod such that when the enclosure is installed and tethered from the exposed grounding eye to an earthen anchor point via the rope, strap or metal rod, and the enclosure is subsequently exposed to a lateral force from the wind, the corner where the exposed grounding eye is installed becomes aligned pointing into the wind and the linear force of the wind does not impinge perpendicularly on any side of the enclosure.

2. A protective enclosure of claim 1 further comprising a second secured hatch installed in at least one female interconnect.

3. A protective enclosure of claim 1 further comprising at least one translucent plastic panel sealed in an aperture interconnect.

4. A protective enclosure of claim 1 further comprising a mechanism for pulling a cord to remove a securable hatch.

5. A protective enclosure of claim 1 further comprising a mechanism for turning a handle to remove a securable hatch.

* * * * *